(12) United States Patent
Lim

(10) Patent No.: US 10,446,032 B2
(45) Date of Patent: Oct. 15, 2019

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventor: Ji Hyun Lim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/997,962

(22) Filed: Jun. 5, 2018

(65) Prior Publication Data
US 2019/0197899 A1    Jun. 27, 2019

(30) Foreign Application Priority Data
Dec. 21, 2017 (KR) .......................... 10-2017-0176614

(51) Int. Cl.
| | |
|---|---|
| *G08G 1/00* | (2006.01) |
| *G08G 1/16* | (2006.01) |
| *G08G 1/0968* | (2006.01) |
| *G08G 1/0967* | (2006.01) |
| *H04W 4/02* | (2018.01) |

(52) U.S. Cl.
CPC ....... *G08G 1/161* (2013.01); *G08G 1/096791* (2013.01); *G08G 1/096805* (2013.01); *G08G 1/096716* (2013.01); *H04W 4/025* (2013.01)

(58) Field of Classification Search
CPC ............. G08G 1/161; G08G 1/096791; G08G 1/096805; G08G 1/096716; H04W 4/025
USPC .......................................................... 340/901
See application file for complete search history.

(56) References Cited

U.S. PATENT DOCUMENTS

| | | | |
|---|---|---|---|
| 7,782,227 B2 | 8/2010 | Boss et al. | |
| 9,147,353 B1* | 9/2015 | Slusar ................. | G09B 19/167 |
| 9,151,625 B2* | 10/2015 | Lee ........................ | G01C 21/26 |
| 9,159,231 B2* | 10/2015 | Noh ................ | G08G 1/096741 |
| 10,176,524 B1* | 1/2019 | Brandmaier ........... | G06Q 40/08 |
| 10,205,670 B2* | 2/2019 | Tan ........................ | H04W 40/20 |
| 2013/0342333 A1* | 12/2013 | Hutchings ........ | G08G 1/096791 |
| | | | 340/435 |
| 2016/0073298 A1* | 3/2016 | Brahmi ............. | H04W 36/0072 |
| | | | 455/436 |

(Continued)

FOREIGN PATENT DOCUMENTS

| | | |
|---|---|---|
| JP | 2001-283372 A | 10/2001 |
| JP | 2005-202605 A | 7/2005 |

(Continued)

*Primary Examiner* — Zhen Y Wu
(74) *Attorney, Agent, or Firm* — Morgan, Lewis & Bockius LLP

(57) ABSTRACT

A vehicle include: a communicator configured to collect information from first adjacent vehicles in a first range; a storage configured to store the information collected by the communicator; and a controller configured to generate first traffic information based on the collected information, select a first adjacent vehicle, which collects second traffic information about second adjacent vehicles in a second range, from the first adjacent vehicles, and generate driving route traffic information about a driving route based on the first traffic information and the second traffic information transmitted by the first adjacent vehicle.

18 Claims, 8 Drawing Sheets

(56) References Cited

U.S. PATENT DOCUMENTS

| | | | |
|---|---|---|---|
| 2016/0084669 A1* | 3/2016 | Kim | G01C 21/3629 |
| | | | 701/400 |
| 2016/0225260 A1* | 8/2016 | Lin | B60R 25/24 |
| 2016/0277911 A1* | 9/2016 | Kang | H04W 4/90 |
| 2017/0124869 A1* | 5/2017 | Popple | G08G 1/096725 |
| 2017/0132922 A1* | 5/2017 | Gupta | G08G 1/0962 |
| 2018/0208185 A1* | 7/2018 | Nagraj Rao | B60W 30/0956 |
| 2018/0222444 A1* | 8/2018 | Nishiyama | B60R 25/24 |
| 2019/0012908 A1* | 1/2019 | Chun | G01S 19/42 |

FOREIGN PATENT DOCUMENTS

| | | |
|---|---|---|
| JP | 2005-210214 A | 8/2005 |
| KR | 10-0515952 B1 | 9/2005 |
| KR | 10-2007-0121412 A | 12/2007 |
| KR | 10-1055027 B1 | 8/2011 |

\* cited by examiner

VEHICLE AND CONTROL METHOD THEREOF

CROSS-REFERENCE TO RELATED APPLICATION(S)

This application is based on and claims the benefit of priority under 35 U.S.C. § 119 to Korean Patent Application No. 10-2017-0176614, filed on Dec. 21, 2017, in the Korean Intellectual Property Office, the disclosure of which is incorporated by reference herein in its entirety

TECHNICAL FIELD

The present disclosure relates to a vehicle collecting traffic information using vehicle to vehicle (V2V) communication and a control method thereof.

BACKGROUND

V2X communication is passing of information in which a vehicle itself becomes a subject and shares information with other portable terminals, a communication network, or vehicles, and represents a communication technology between a vehicle and interfaces.

Such V2X communication includes vehicle to nomadic device (V2N) communication, vehicle to vehicle (V2V) communication, and vehicle to infrastructure (V2I) communication.

V2X communication can lead to a new paradigm change in communication method transmitted to the vehicle.

On the other hand, in the conventional manner, the subject of generating and providing traffic information is a traffic information center. The traffic information centers incur huge investment costs and additional costs for operation. In addition, in order for the traffic information center to collect information, there has been a problem in that an information collector and a communication device are separately installed for each road.

In addition, the traffic information transmitted through the traffic information center has a problem in accuracy because the number of vehicles corresponding to the collected samples is limited and the traffic information is generated based on information collected from a limited sample.

SUMMARY

An aspect of the present disclosure provides a vehicle capable of improving the quality of a navigation service through traffic information collected in real time, by collecting information, which is desired by the vehicle, through a vehicle to vehicle (V2V) communication without using a traffic information center, and by using the collected information, and a control method thereof.

Additional aspects of the present disclosure will be set forth in part in the description which follows and, in part, will be obvious from the description, or may be learned by practice of the present disclosure.

In accordance with an aspect of the present disclosure, a vehicle include: a communicator configured to collect information from first adjacent vehicles in a first range; a storage configured to store the information collected by the communicator; and a controller configured to generate first traffic information based on the collected information, select a first adjacent vehicle collecting second traffic information about second adjacent vehicles in a second range, from the first adjacent vehicles, and generate driving route traffic information about a driving route based on the first traffic information and the second traffic information transmitted by the first adjacent vehicle.

The first traffic information may include at least one of a representative speed or an average speed calculated by using speed information transmitted by the first adjacent vehicles.

The controller may generate the driving route traffic information by combining first road link information contained in the first traffic information with second road link information contained in the second traffic information.

The communicator may transmit the second traffic information to the controller according to a priority.

The controller may determine whether the first adjacent vehicle is present in the first range, and generates the first traffic information based on a driving direction and a driving state of the first adjacent vehicle.

The controller may select the second adjacent vehicle generating the second traffic information, from the second adjacent vehicles.

The controller may select the second adjacent vehicle based on at least one of a driving state or a driving direction.

When the first adjacent vehicle is out of the first range, the controller may re-select the first adjacent vehicle from the first adjacent vehicles, based on a distance.

When an adjacent vehicle is not present in the first range, the controller may store speed information of the vehicle in the storage for a predetermined period of time.

When an adjacent vehicle may be not present in the second range, the controller generates the second traffic information.

The controller may determine an arrival time to a destination, based on the generated driving route traffic information.

In accordance with another aspect of the present disclosure, a control method of a vehicle includes: collecting, by a communicator, information from first adjacent vehicles in a first range; storing, by a storage, the information transmitted from the first adjacent vehicles; generating, by a controller, first traffic information based on the collected information; selecting, by the controller, a first adjacent vehicle collecting second traffic information about second adjacent vehicles in a second range, from the first adjacent vehicles; and generating, by the controller, driving route traffic information about a driving route based on the first traffic information and the second traffic information transmitted by the first adjacent vehicle.

The first traffic information may include at least one of a representative speed or an average speed calculated by using speed information transmitted by the first adjacent vehicles.

The generation of the traffic information about the driving route may include generating the driving route traffic information by combining first road link information contained in the first traffic information with second road link information contained in the second traffic information.

The storing of the information may include storing the second traffic information according to a priority.

The selection may include selecting the second adjacent vehicle generating the second traffic information, from the second adjacent vehicles.

The selection may include selecting the second adjacent vehicle based on at least one of a driving state or a driving direction.

The selection may include re-selecting the first adjacent vehicle from the first adjacent vehicles, based on a distance, when the first adjacent vehicle is out of the first range.

The storing of the information may include storing speed information of the vehicle for a predetermined period of time, when an adjacent vehicle is not present in the first range.

The selection may include generating the second traffic information when an adjacent vehicle is not present in the second range.

The collection may include performing communication with the first adjacent vehicles for a predetermined period of time.

The generation of the driving route traffic information may include determining an arrival time to a destination, based on the generated driving route traffic information.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
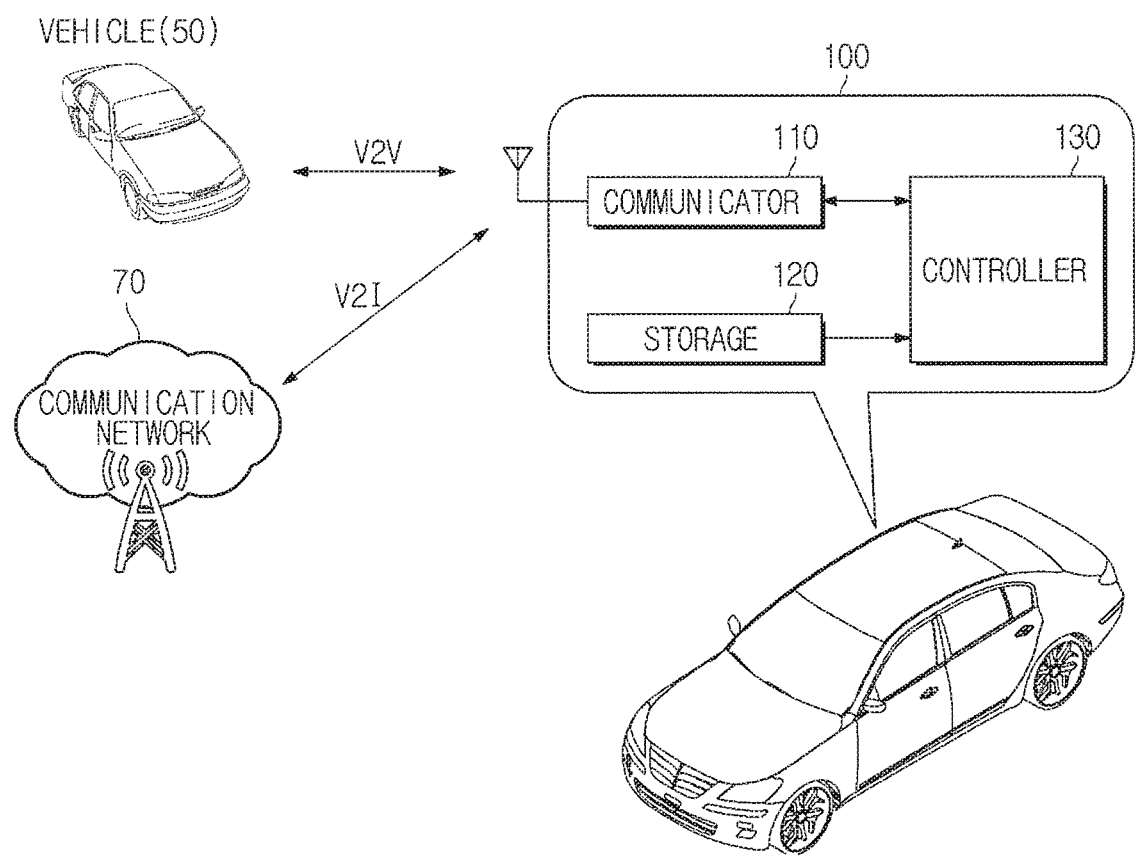
FIG. 1 is a control block diagram illustrating a vehicle communicating with the outside according to an exemplary embodiment of the present disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

When a part "includes" or "comprises" an element, unless there is a particular description contrary thereto, the part may further include other elements, not excluding the other elements.

Throughout the description, when a member is "placed on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

Reference will now be made in detail to embodiments of the present disclosure, examples of which are illustrated in the accompanying drawings.

FIG. 1 is a control block diagram illustrating a vehicle communicating with outside according to an exemplary embodiment of the present disclosure.

Referring to FIG. 1, a vehicle 100 may include a communicator 110, a storage 120, and controller 130.

First, the communicator 110 may receive traffic information from the outside of the vehicle 100 such as an adjacent vehicle 50 and a communication network 70. The communicator 110 may store the received information in the storage 120 through the controller 130.

The communicator 110 may be a hardware device capable of transmitting an analog or digital signal over wire or wirelessly and may include one or more components that enable communication with an external device. Examples of the communicator 110 include Bluetooth devices, infrared devices, modem, network card (using Ethernet), smartphone, Wi-Fi devices (using a Wi-Fi router), etc.

Particularly, a V2X communication used by the communicator 110 may communicate with the adjacent vehicle 50 through a frequency of 5.9 GHz band by using Dedicated Short Range Communication (DSRC) or Wireless Access in Vehicular Environment (WAVE).

In addition, the communicator 110 may communicate with the adjacent vehicle 50 located in a predetermined range. For example, the communicator 110 may receive data related to traffic information from the adjacent vehicle 50 located in the range of approximately 300 m to approximately 500 m.

On the other hand, the above-described range or protocol is only an example of a communication method between the communicator 110 and the adjacent vehicle 50, and thus the communication method may be variable.

The communicator 110 may include one or more components configured to allow the communication with an external device, wherein the communicator may include at least one of a short range communication module, a wired communication module, or a wireless communication module.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wireless communication module may include a wireless communication module supporting a variety of wireless communication methods, e.g., Wifi module, Wireless broadband module, global System for Mobile (GSM) Communication, Code Division Multiple Access (CDMA), Wideband Code Division Multiple Access (WCDMA), Universal Mobile Telecommunications System (UMTS), Time Division Multiple Access (TDMA), and Long Term Evolution (LTE).

The wireless communication module may include a wireless communication interface having an antenna and a transmitter that transmits a signal to the adjacent vehicle 50. In addition, the wireless communication module may further include a signal conversion module for modulating a digital control signal output from the controller 130 via the wireless communication interface according to the control of the controller 130, into an analogy wireless signal.

The wireless communication module may include a wireless communication interface having an antenna and a receiver that receives a signal transmitted by the adjacent vehicle 50. In addition, the wireless communication module may further include a signal conversion module for demodulating a digital control signal output from the controller 130 via the wireless communication interface according to the control of the controller 130, into a digital control signal.

The communicator 110 may further include a wired communication module transmitting data with components in the vehicle 100, wherein the wired communication module may include a variety of cable communication modules such as Controller Area Network (CAN), Local Interconnection Network (LIN), and Media Oriented System Transport (MOST). The storage 120 may store information from the adjacent vehicle 50 in a range which is predetermined with respect to the vehicle 100 by the communicator 110. The controller 130 may generate traffic information of a driving route from a current position of the vehicle 100 to a destination, based on the information collected by the storage 120.

The storage 120 is a hardware device also known as a computer data storage or memory and is a technology consisting of computer components and recording media that are used to retain digital data.

The stored information may include safety information such as accident information, which is transmitted by the adjacent vehicle 50 ahead of the vehicle 100, and may include at least one piece of information of speed limit information or speed information of a plurality of vehicles, which moves in a predetermined range.

The storage 120 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto. The storage 120 may be a memory that is implemented by a separate memory chip from the aforementioned processor related to the controller 130 or the storage may be implemented by a single chip with a processor.

The controller 130 may correspond to a processor controlling overall control of the vehicle 100 and may control each configuration in the vehicle 100 such as the communicator 110 and the storage 120.

The controller 130 may generate traffic information (hereinafter referred to as first traffic information) of the adjacent vehicle 50 located in a range (hereinafter referred to as a first range) that is predetermined with respect to the vehicle 100, based on information transmitted by the adjacent vehicle 50. In addition, the controller 130 may ask the adjacent vehicle 50 to collect traffic information about the second range from an adjacent vehicle located in a range (hereinafter referred to as a second range) that is predetermined range other than the first range.

That is, by using a relay method, the controller 130 may receive the second traffic information of the adjacent vehicle 50 in the second range, in which the vehicle 100 is not capable of direct V2V communication.

For example, the controller 130 may determine an arrival time from a current position to route contained in the second range, by integrating an average speed (hereinafter referred to as a first average speed) of the adjacent vehicle 50 in the first range and an average speed (hereinafter referred to as a second average speed) of the adjacent vehicle 50 in the second range.

Alternatively, when the range includes a plurality of ranges from the current position to the destination, the controller 130 may collect third traffic information to $N_{th}$ traffic information from a plurality of adjacent vehicles through the relay method, and generate traffic information related to a route to the destination by integrating first traffic information generated from the adjacent vehicle in the first range with the third traffic information to the $N_{th}$ traffic information.

Accordingly, the vehicle 100 may receive traffic information to which the real time information is applied, in comparison with traffic information transmitted via a communication network 70 such as the traffic information center. Therefore, it may be possible to provide traffic information that is more valuable than information provided by the navigation service in the conventional manner.

The controller 130 may be integrated with a storage medium capable of storing data, and may be integrated into a system on chip (SOC) built in the vehicle 100. However, there is no limitation in the number of SOC built in the vehicle 100 and thus a single or a plurality of SOC may be provided.

In the present disclosure, the controller 130 may be an electronic control unit (ECU). In addition, the various embodiments disclosed herein, including embodiments of the vehicle 100 and/or elements thereof, can be implemented using one or more processors coupled to a memory (or other non-transitory machine readable recording medium) storing computer-executable instructions for causing the processor (s) to perform the functions described above including the functions described in relation to the communicator 110 and the communicator 110.

The vehicle 100 may include other modules or configurations which are not described in the description and a name of the configuration may be changed.

Figure 2:
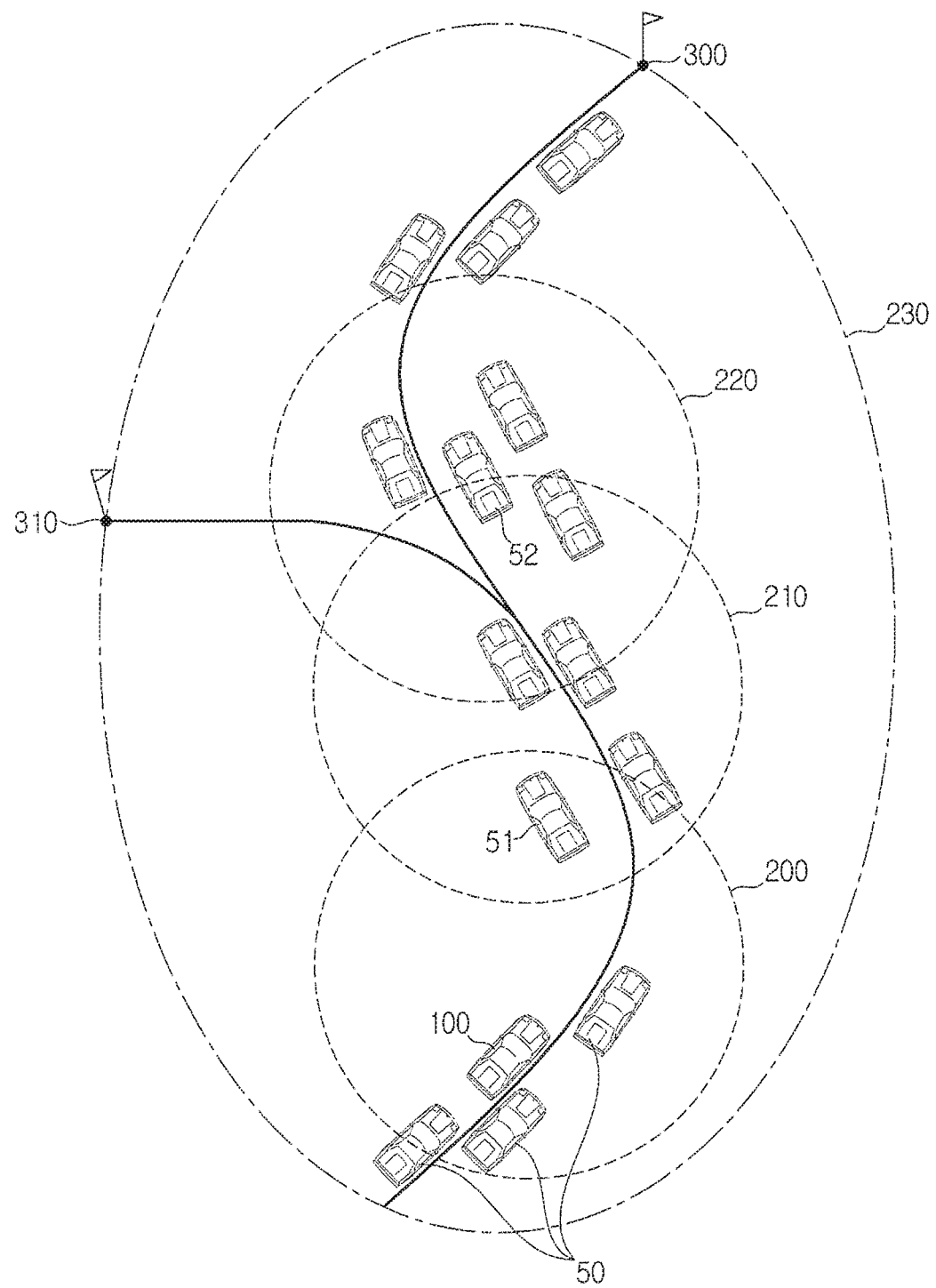
FIG. 2 is a view illustrating a range and a method of receiving traffic information from an adjacent vehicle by the vehicle.
Figure 3:
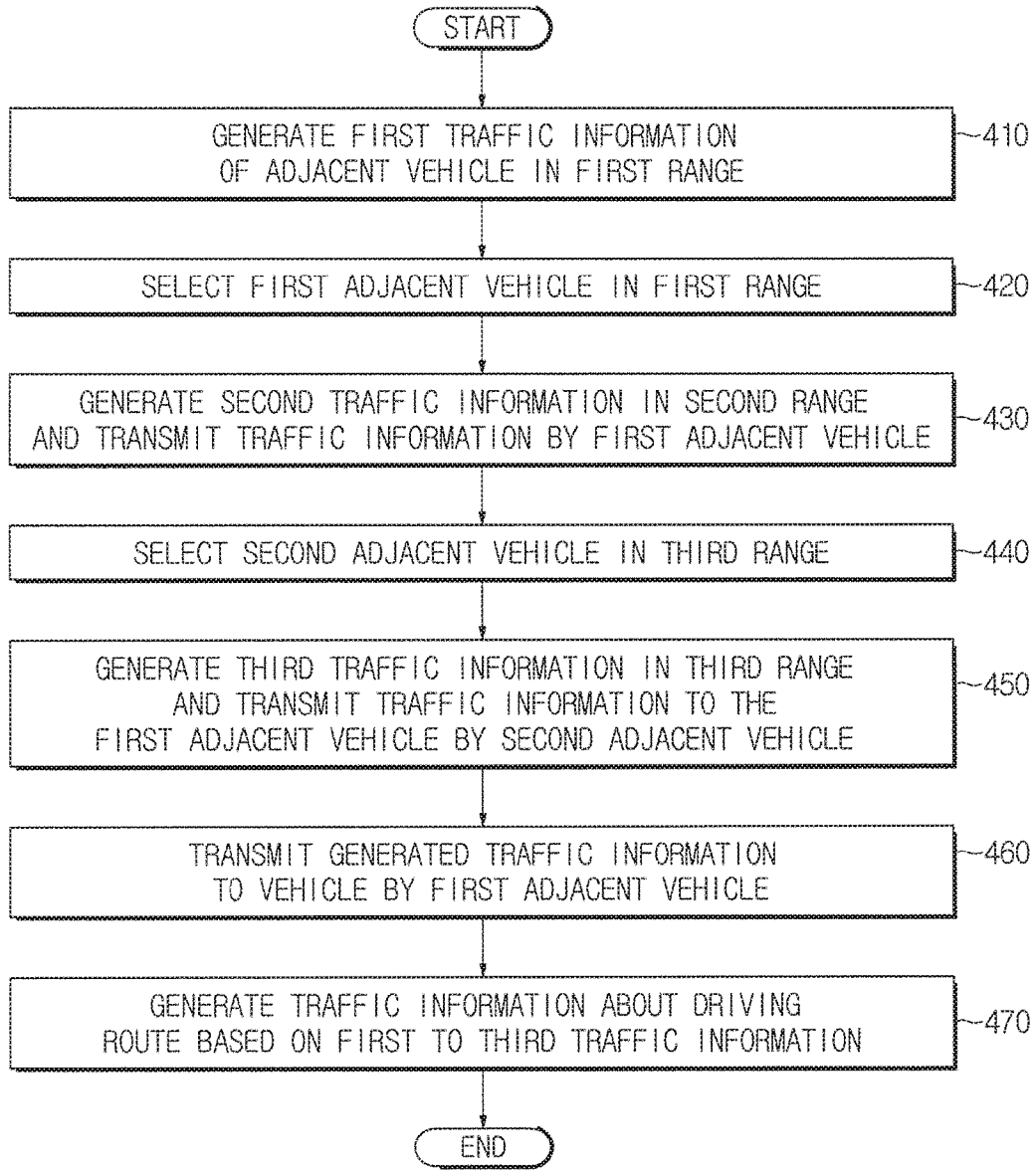
FIG. 3 is a flowchart illustrating the above method for generating the traffic information. It will be described together to avoid duplicate description.

FIG. 2 is a view illustrating a range and a method of receiving traffic information from an adjacent vehicle by the vehicle, and FIG. 3 is a flowchart illustrating the above method for generating the traffic information. It will be described together to avoid duplicate description.

Referring to FIG. 2, the vehicle 100 may generate the first traffic information by receiving speed information of the adjacent vehicle 50 in the first range 200 that is predetermined with respect to the vehicle 100, i.e., the vehicle 100 is capable of direct V2V communication.

The vehicle 100 may generate traffic information about a driving route included in the first range 200, but the vehicle 100 may not generate traffic information about a second range 210 and a third range 220.

Therefore, the vehicle 100 may select at least one vehicle (hereinafter referred to as a first adjacent vehicle 51) among a plurality of vehicles included in the first range 200 and ask the first adjacent vehicle 51 to receive traffic information generated in the second range 210.

After the vehicle 100 selects the first adjacent vehicle 51, the first adjacent vehicle 51 may receive speed information from a plurality of adjacent vehicles in the second range 210 and generate second traffic information.

Since the vehicle 100 cannot generate traffic information of the third range 220, the vehicle 100 may ask the first adjacent vehicle 51 to select a second adjacent vehicle 52 of the third range 220 and to receive an average speed.

When the communicator 110 receives the second traffic information of the second range 210 and the third range 220 from the first adjacent vehicle 51, the controller 130 may generate traffic information of a driving route 300 among a plurality of routes 300 and 310, by integrating the first traffic information stored in the storage 120 with the second traffic information.

Referring to FIG. 3, the vehicle 100 may generate the first traffic information based on the information collected from the adjacent vehicle in the first range (410).

As illustrated in FIG. 2, the first range 200 may correspond to a range that is set to allow the vehicle 100 to directly perform the V2V communication. The predetermined range may be changed according to user's settings and performance of the communicator 110.

The vehicle 100 may select the first adjacent vehicle 51 in the first range 200, wherein the first adjacent vehicle 51 is to receive traffic information about other range (420).

The vehicle 100 may select the first adjacent vehicle 51 such that the vehicle 100 selects a vehicle, which is capable of communicating with an adjacent vehicle in the second range, from the adjacent vehicles 50 in the first range 200, as the first adjacent vehicle 51. A selection criterion may include a driving direction of the adjacent vehicles 50 and 51 as well as a distance thereof, and a speed of the adjacent vehicle that is changed at a period of the V2V communication.

For example, the vehicle 100 may select an adjacent vehicle, which is the furthest away from the vehicle 100, among the adjacent vehicles in the first range 200, as the first adjacent vehicle 51.

On the other hand, the criteria are not limited thereto and thus the criteria may vary.

The first adjacent vehicle 51 may generate second traffic information from the adjacent vehicle included in the second range 210, and transmit the second traffic information to the vehicle 100 (430).

That is, when the controller 130 asks the first adjacent vehicle 51 to generate the second traffic information, the first adjacent vehicle 51 may receive information from the plurality of adjacent vehicles in the second range and generate traffic information about the second range (i.e., the second traffic information).

When the second traffic information is generated, the communicator 110 may receive the second traffic information.

Further, the vehicle 100 may select the second adjacent vehicle 52, which is to generate the third traffic information, in the third range 220 (440).

The vehicle 100 may select the second adjacent vehicle 52 based on the information transmitted by the first adjacent vehicle 51. For example, the vehicle 100 may select the second adjacent vehicle 52 based on at least one of the number of the adjacent vehicle in the second range, and a driving state, and a progress state of the adjacent vehicle in the second range.

In the same manner, as the first adjacent vehicle 51, the second adjacent vehicle 52 may collect information from the adjacent vehicle in the third range 220 and generate the third traffic information. The generated third traffic information may be transmitted to the first adjacent vehicle 51 (450).

After the vehicle 100 selects the second adjacent vehicle 52, the vehicle 100 may ask the first adjacent vehicle 51 to collect the third traffic information from the second adjacent vehicle 52 via the communicator 110. The second adjacent vehicle 52 may transmit the third traffic information to the first adjacent vehicle 51.

When the first adjacent vehicle 51 receives the third traffic information, the first adjacent vehicle 51 may transmit the third traffic information to the vehicle 100 (460).

The first adjacent vehicle 51 may transmit the third traffic information to the vehicle 100 and the vehicle 100 may collect the third traffic information. That is, the vehicle 100 may receive the traffic information from the first adjacent vehicle 51 and the second adjacent vehicle 52 instead of directly generating the traffic information of the second range 210 and the third range 220.

Finally, the vehicle 100 may generate traffic information about the driving route based on the collected first to third traffic information (470).

The first traffic information to the third traffic information may additionally include road link information for each range as well as an average speed of the adjacent vehicle 50, 51 and 52.

The controller 130 may generate traffic information about each driving route by matching the plurality of driving route 300 and 310 on the navigation map, with the road link information. When a destination is designated, the controller 130 may select the fastest route by matching the traffic information to the destination, and may additionally generate a real-time road condition and an arrival time based on the selected traffic information.

As a result, the controller 130 may generate the traffic information about the driving route and output the traffic information to a driver.

Figure 4:
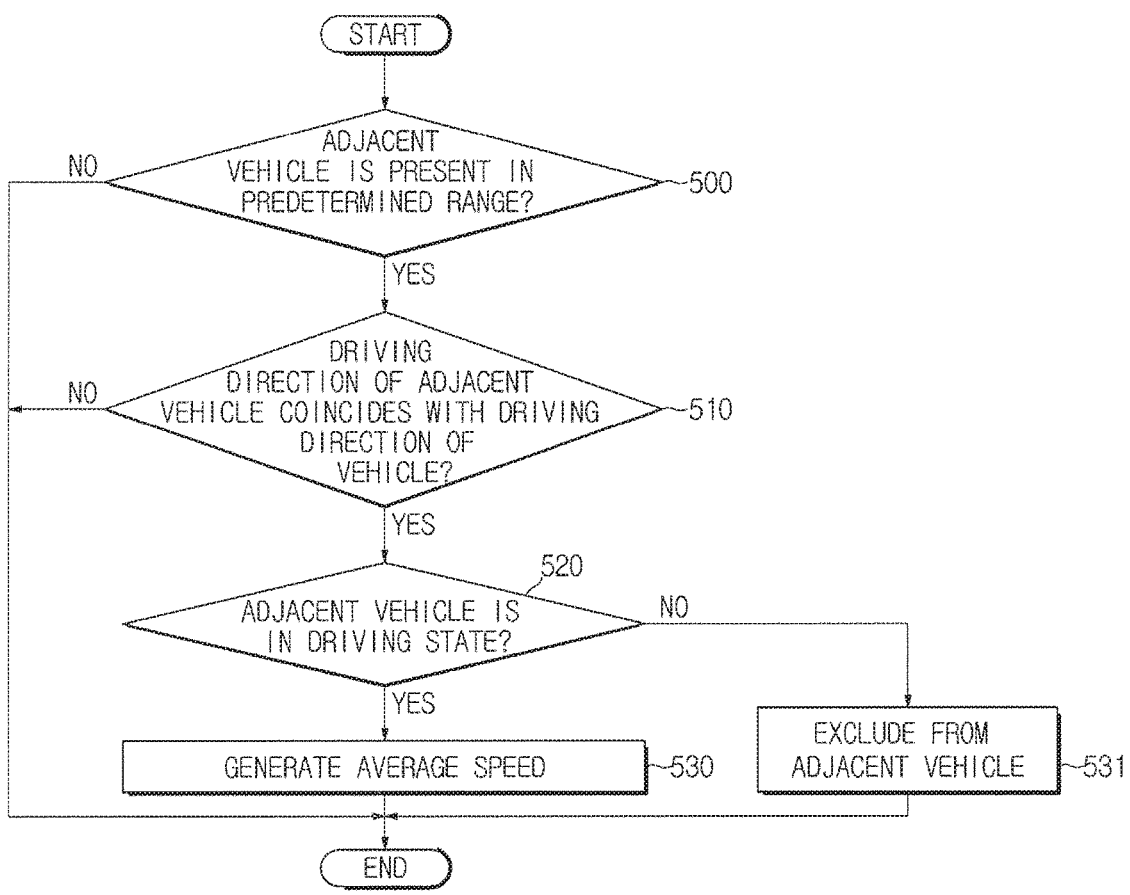
FIG. 4 is a flowchart illustrating a method of calculating an average speed according to an exemplary embodiment of the present disclosure.

FIG. 4 is a flowchart illustrating a method of calculating an average speed according to an exemplary embodiment of the present disclosure. The average speed may be calculated based on the driving speed of the adjacent vehicle 50 in the first range.

Referring to FIG. 4, the controller 130 may determine whether the adjacent vehicle 50 is present in the predetermined range (500). The predetermined range may include the first range in which the vehicle 100 is included and other ranges that do not include the vehicle 100.

The V2V communication has a predetermined period, and the communicator 110 transmits the signal. Accordingly, the adjacent vehicle 50 may transmit a response signal. In this case, the controller 130 may determine that the adjacent vehicle 50 is present.

When the communicator 110 does not receive the response signal or the speed information transmitted by the adjacent vehicle 50, the controller 130 may acquire or generate the traffic information through a variety of different methods.

For example, when the adjacent vehicle is not present in the predetermined range, the vehicle 100 may determine that the traffic in the range is smooth and generate traffic information about the range. That is, the controller 130 may generate the traffic information based on the distance in the range, and the speed limit of the road.

When the adjacent vehicle 50 is present, the controller 130 may determine whether the driving direction of the adjacent vehicle 50 coincides with the driving direction of the vehicle 100 (510).

The driving direction may be contained in a transmission signal of the adjacent vehicle 50 that is received by the communicator 110 in the head direction of the vehicle 100.

When it is determined that the driving direction of the adjacent vehicle 50 does not coincide with the driving direction of the vehicle 100, the controller 130 may exclude the vehicle corresponding to the received information, from candidates of the adjacent vehicle 50 which are subject to determine an average speed (531).

When the driving directions coincide with each other, the controller 130 may determine the driving state of the adjacent vehicle 50 (520).

The determination of the driving state may represent determining whether the adjacent vehicle 50 is stopped or the adjacent vehicle 50 drives at a speed equal to or faster than a reference, wherein information about the adjacent in the stopped state may be not needed to determine a speed in which the vehicle drives on the driving route. Therefore, the controller 130 may secondarily consider the driving state as a criterion for calculating the average speed.

When the adjacent vehicle 50 is in the stopped state, that is, not in the driving state, the controller 130 may exclude the adjacent vehicle 50 from the candidate group that calculates the average speed (531).

The controller 130 may calculate an average speed based on the speed of the adjacent vehicle 50 having the same driving direction as the vehicle 100 among the adjacent vehicles 50, which response through the communicator 130, in the predetermined range (530).

Particularly, the average speed may be calculated by the following Equation $$\text{Average speed} = \text{sum of cumulative speed/cumulative vehicle} \quad [\text{Equation 1}]$$

In Equation 1, sum of cumulative speed represents sum of cumulative speed periodically transmitted from the adjacent vehicle 50 contained in the candidate group, and cumulative vehicle represents the number of the adjacent vehicle 50.

The average speed is not limited to the equation 1. For example, since an average speed represents a speed on the driving route in a position, corresponding to the reference, in which the vehicle 100 is placed, a driving speed of the vehicle 100 may be considered.

All of or a part of the steps method and/or operations of the foregoing embodiments can be realized using computer hardware and computer programs executed thereon.

Meanwhile, the controller 130 may generate or collect traffic information using a representative speed as well as an average speed. In detail, the representative speed may be a driving speed of an adjacent vehicle 50 farthest away from the vehicle 100 among a plurality of adjacent vehicle 50, which moves in a predetermined range. In addition, the representative speed may be a driving speed of an adjacent vehicle 50 which has the fairest communication with the vehicle 100 among a plurality of adjacent vehicles 50 which moves in a predetermined range.

Figure 5:
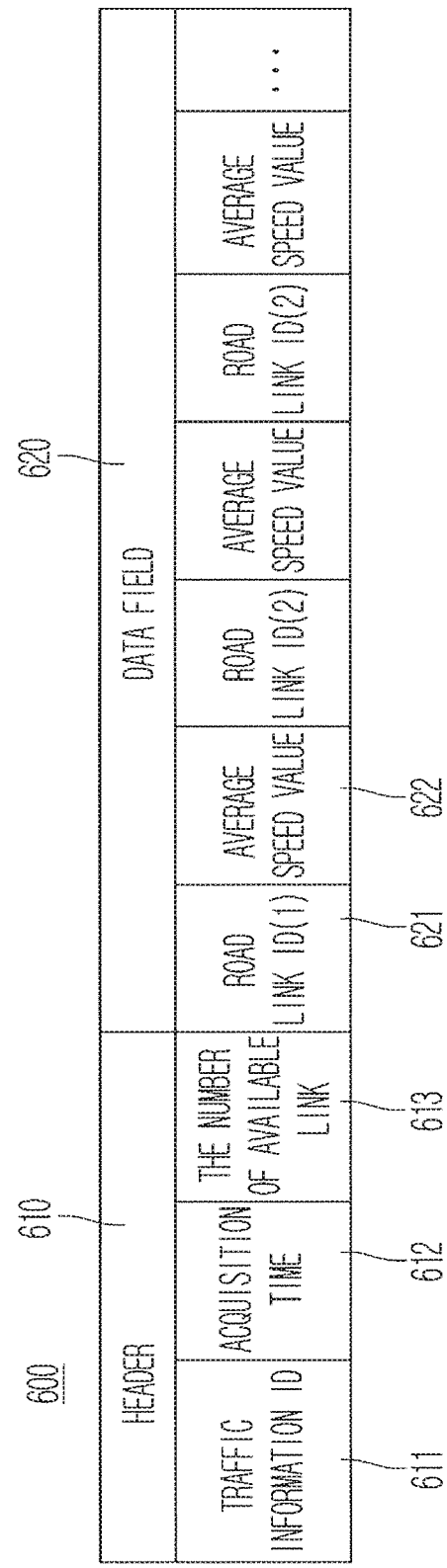
FIG. 5 is a view illustrating a data structure of stored traffic information according to an exemplary embodiment of the present disclosure.

FIG. 5 is a view illustrating a data structure of stored traffic information according to an exemplary embodiment of the present disclosure.

Information collected in real-time via the V2V communication may include multiple data contained in a variety of ranges. Therefore, greater amount of traffic information collected through the relay method is accumulated as a driving route from the current position of the vehicle 100 to the destination is increased, which causes a problem of excessive communication data and stored loads.

Therefore, the controller 130 may simplify the traffic information stored in the storage 120, as illustrated in FIG. 5.

Particularly, the traffic information may be indicated by an average speed value of a road link in which a vehicle is placed, wherein the vehicle is a representative selected in each range, and thus, the traffic information may be structured by indicating the road link ID and the average speed value, as illustrated in FIG. 5.

Referring to FIG. 5, a header 610 may include traffic information ID 611 for identifying traffic information, an acquisition time 612 in which the traffic information is acquired, the number of link 613 contained in a data field 620.

The data field 620 may include a first road link ID 621 and an average speed value 622, and the average speed value is a value calculated in FIG. 4. In addition, the data field 620 may include a plurality of road link IDs 621 and an average speed values 622.

In addition, among the plurality of road link IDs 621 and an average speed values 622, a priority of the transmission of the information may be determined according to the priority determined in the V2X standard specification. However, when the present disclosure is used in a country in which a standard is not set, the priority may be determined according to information related to the safety as described above.

The simplification operation of FIG. 5 is merely an example of the present disclosure and may be variously modified.

Figure 6:
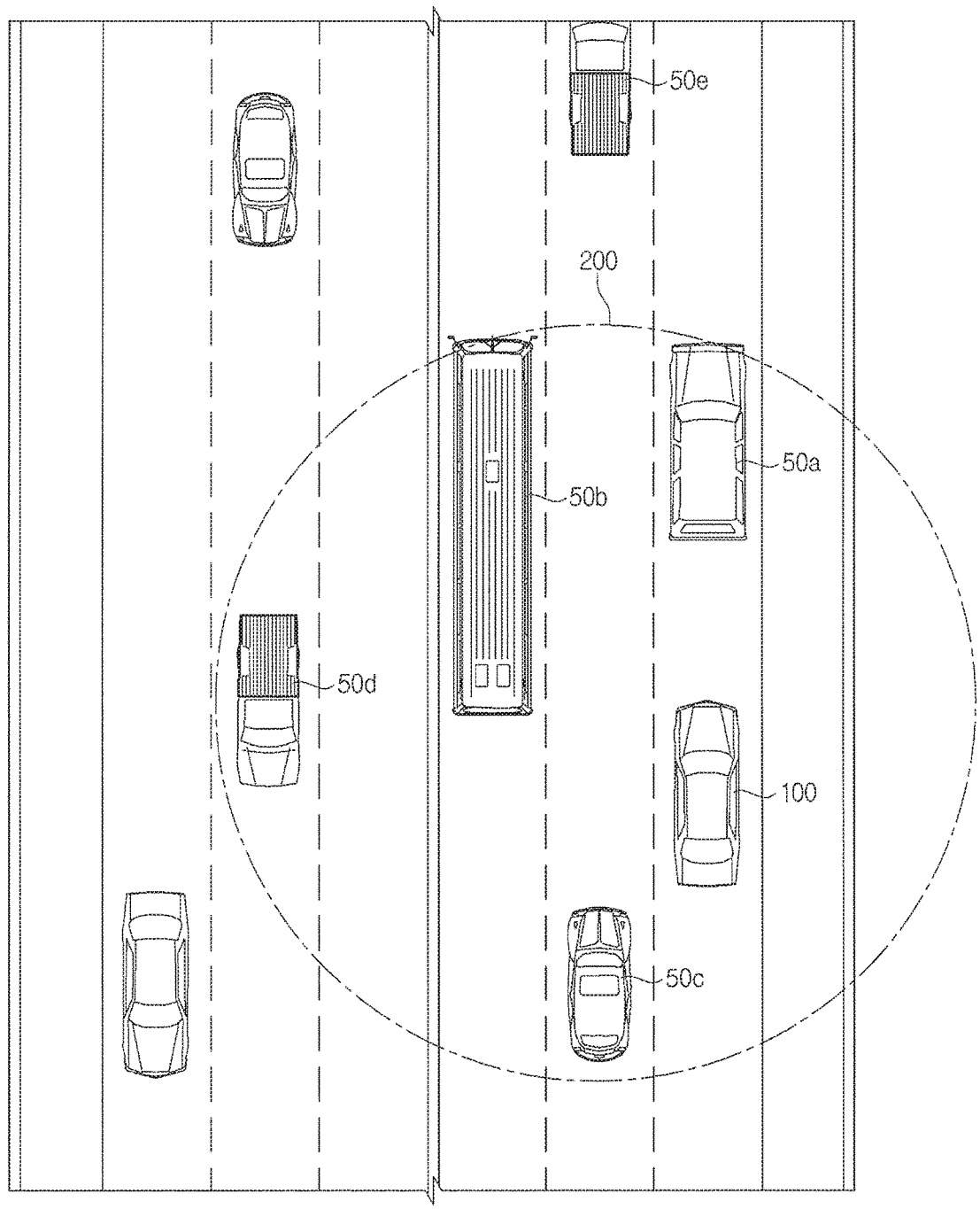
FIGS. 6 to 8 are views illustrating an example of selecting an adjacent vehicle.
Figure 7:
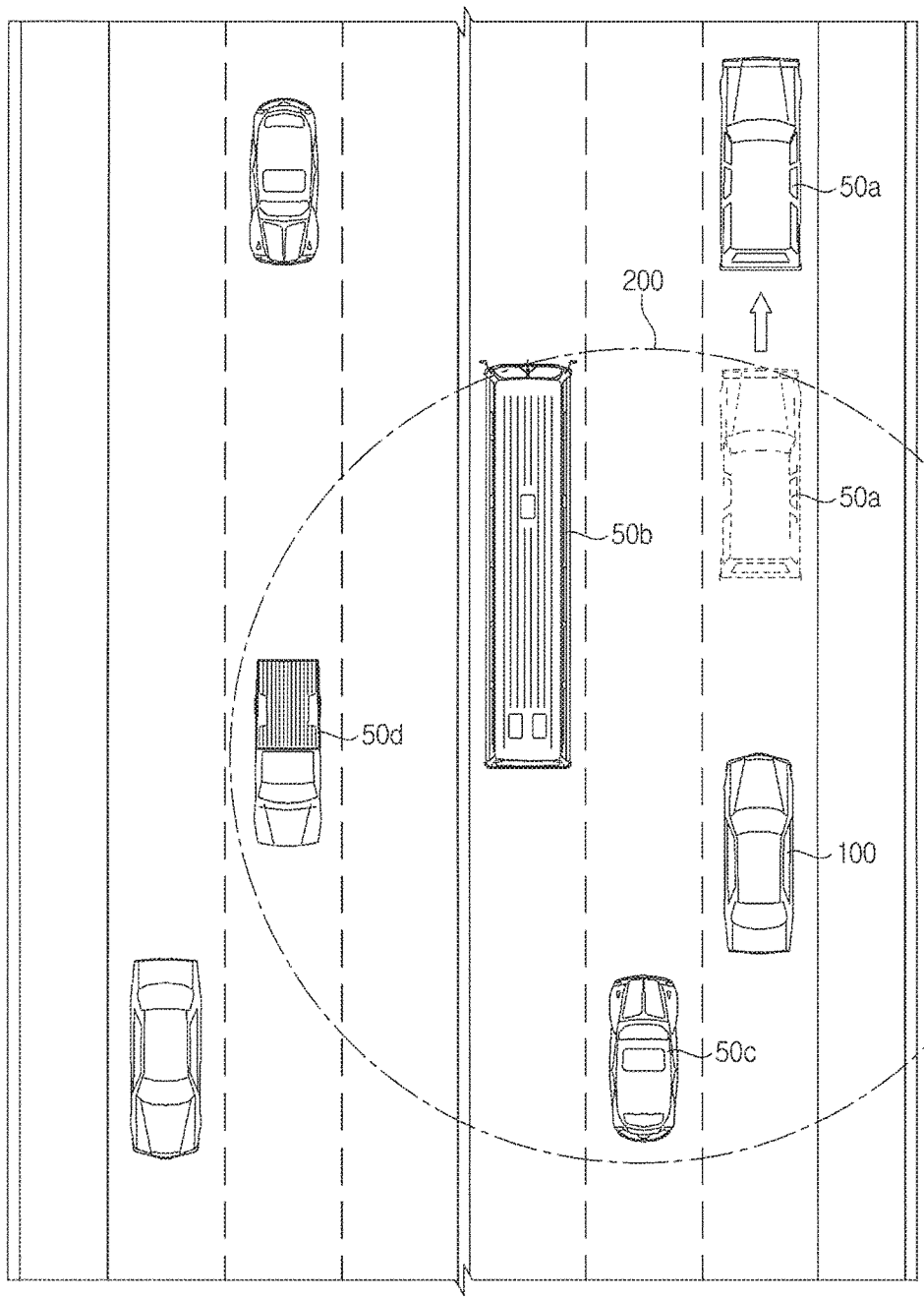
Figure 8:
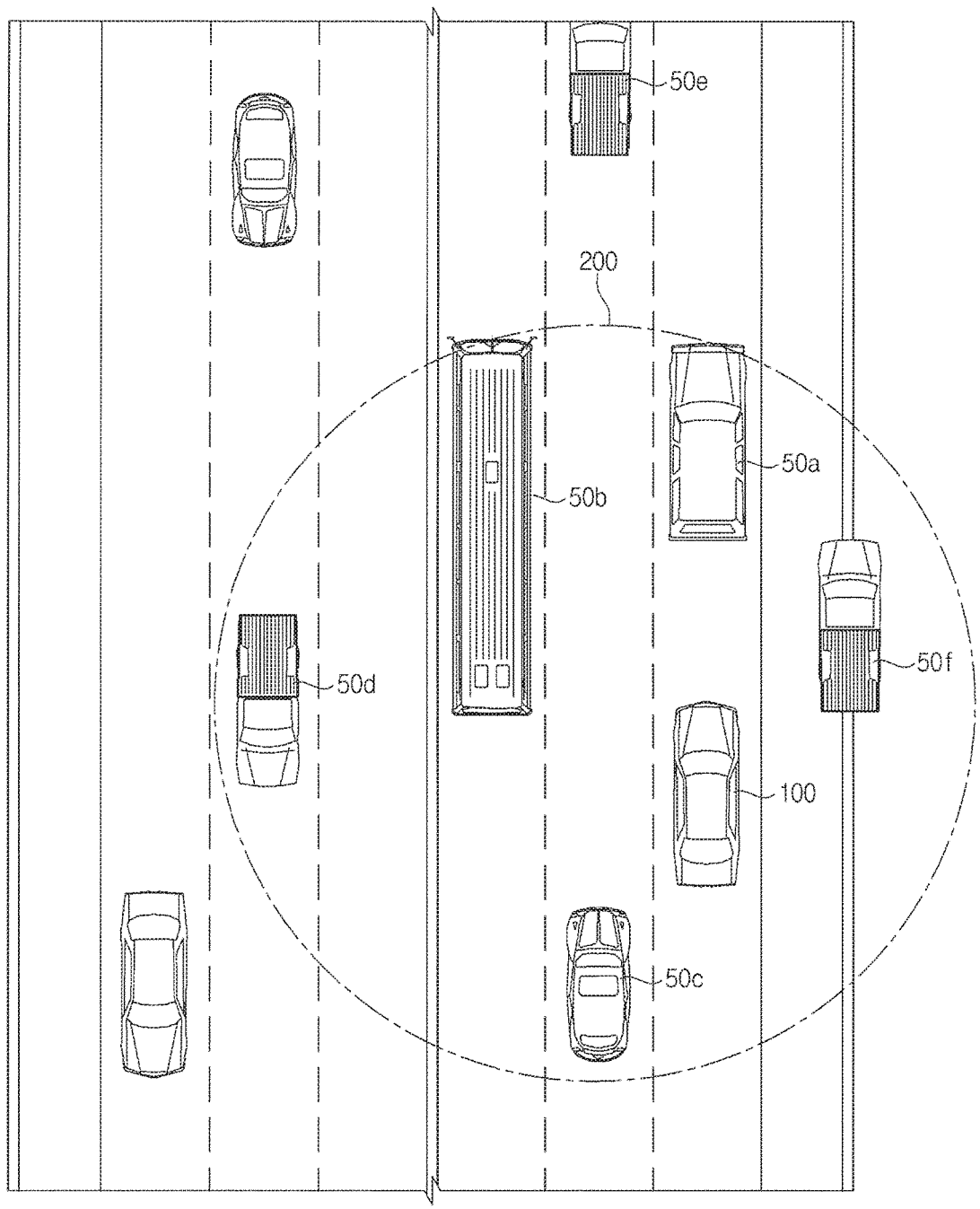

FIGS. 6 to 8 are views illustrating an example of selecting an adjacent vehicle. It will be described together to avoid duplicate description.

Particularly, FIG. 6 illustrates a case of selecting an adjacent vehicle 50 with respect to a driving direction.

Referring to FIG. 6, the vehicle 100 may perform the communication with the adjacent vehicle 50 in the predetermined first range 200. In the first range 200, four vehicles 50a, 50b, 50c, and 50d are present. Among those, a fourth adjacent vehicle 50d may be excluded from a candidate group for generating the traffic information because the fourth adjacent vehicle 50d drives in a direction opposite to a direction in which the vehicle 100 drives on the road route.

The vehicle 100 may select the first adjacent vehicle 51 for the relay, based on the distance information among the plurality of adjacent vehicles 50a, 50b, and 50c having the same driving directions as the vehicle 100. For example, the vehicle 100 may select the adjacent 50a positioned on the right side of the drawing. The selected adjacent vehicle 51 may perform the V2V communication with the adjacent vehicle 50e in response to the request of the vehicle, and collect traffic information about the outside of the first range 200.

FIG. 7 illustrates that the adjacent vehicle 50a increases a driving speed and then deviates from the first range, after the adjacent vehicle 50a is selected as illustrated in FIG. 6.

The vehicle 100 may transmit and receive data with the adjacent vehicle 50 while performing the V2V communication at intervals of 100 msec. That is, the vehicle 100 periodically performs network management.

As illustrated in FIG. 7, when the selected first adjacent vehicle 50a is out of the first range 200 after a predetermined time elapses, the controller 130 may search the adjacent vehicles 50b, 50c, 50d, and 50e in the first range 200 through the communicator 110, and re-select the first adjacent vehicle 51 corresponding to a hub of the relay, according to the distance and the travelling direction.

However, the controller 130 may determine that the adjacent vehicle 50 is not present in the first range 200 during the periodic reception of the data, which is different from FIG. 7.

In this case, the controller 130 may generate the first traffic information indicating that traffic within the first range is smooth, and may be switched to a standby state to receive the second and third traffic information. That is, the controller 130 may continue the search through the communicator 110, and wait for adjacent vehicles to enter the range.

Alternatively, the controller 130 may perform a role of the provider which provides the information to the adjacent vehicle 50c, which requests traffic information, based on the remaining traffic information stored in the storage 120. That is, the controller 130 may store the speed information of the vehicle 100 in the storage 120 for a predetermined period of time.

The controller 130 may perform the V2I communication shown in FIG. 1 and may receive the traffic information from the second adjacent vehicle 52 outside the first range 200 through the communication network 70.

Finally, the controller 130 may determine whether it is possible the communication between the traffic information center and the vehicle 100, and may additionally receive the traffic information generated from the traffic information center.

FIG. 8 illustrates another example of selecting the adjacent vehicle 50 according to the driving state.

Referring to FIG. 8, the vehicle 100 may receive traffic information from an adjacent vehicle 50f in the stopped state in the first range 200 during the vehicle 100 drives.

However, the traffic information of the adjacent vehicle 50f including the stopped state does not help to generate the traffic information on the driving route. Particularly, when the candidate group of the average speed includes the traffic information transmitted from the vehicle in the stopped state, it may cause the increase of the period of time taken to reach the destination and this may result in poor accuracy.

Therefore, the controller 130 may confirm the driving state and ignore the traffic information transmitted by the adjacent vehicle 50f that is stopped on the shoulder.

As is apparent from the above description, the proposed vehicle collects information, which is desired by the vehicle, through the V2V communication and uses the information, and thus the traffic information center may be not required and it may be possible to improve the quality of the navigation service by using traffic information collected in real time.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
a communicator configured to collect information from first adjacent vehicles in a first range; and
a storage configured to store the information collected by the communicator;
a controller configured to:
generate first traffic information based on the collected information;
select a first adjacent vehicle, which collects second traffic information about second adjacent vehicles in a second range, from the first adjacent vehicles, based on at least one of a driving direction and a speed of the first adjacent vehicles;
selects a second adjacent vehicle, which generates the second traffic information, from the second adjacent vehicles, based on at least one of a driving state and a driving direction of the second adjacent vehicles; and
generate driving route traffic information about a driving route based on the first traffic information and the second traffic information transmitted from the first adjacent vehicle.

2. The vehicle of claim 1, wherein
the first traffic information comprises at least one of a representative speed and an average speed calculated by using speed information transmitted by the first adjacent vehicles.

3. The vehicle of claim 1, wherein
the controller generates the driving route traffic information by combining first road link information contained in the first traffic information with second road link information contained in the second traffic information.

4. The vehicle of claim 1, wherein
the communicator transmits the second traffic information to the controller according to a priority.

5. The vehicle of claim 1, wherein
the controller determines whether the first adjacent vehicle is present in the first range, and generates the first traffic information based on a driving direction and a driving state of the first adjacent vehicle.

6. The vehicle of claim 1, wherein
when the first adjacent vehicle is out of the first range, the controller re-selects the first adjacent vehicle from the first adjacent vehicles, based on a distance between the vehicle and the first adjacent vehicles.

7. The vehicle of claim 1, wherein
when an adjacent vehicle is not present in the first range, the controller stores speed information of the vehicle in the storage for a predetermined period of time.

8. The vehicle of claim 1, wherein
when an adjacent vehicle is not present in the second range, the controller generates the second traffic information.

9. The vehicle of claim 1, wherein
the controller determines an arrival time to a destination for the vehicle, based on the generated driving route traffic information.

10. A control method of a vehicle comprising steps of:
collecting, by a collector, information from first adjacent vehicles in a first range;
storing, by a storage, the information transmitted from the first adjacent vehicles:
generating, by a controller, first traffic information based on the collected information;
selecting, by the controller, a first adjacent vehicle, which collects second traffic information about second adjacent vehicles in a second range, from the first adjacent vehicles, based on at least one of a driving direction and a speed of the first adjacent vehicles;
selecting a second adjacent vehicle generating the second traffic information, from the second adjacent vehicles, based on at least one of a driving state or a driving direction of the second adjacent vehicles; and
generating, by the controller, driving route traffic information about a driving route based on the first traffic information and the second traffic information transmitted by the first adjacent vehicle.

11. The control method of claim 10, wherein
the first traffic information comprises at least one of a representative speed and an average speed calculated by using speed information transmitted by the first adjacent vehicles.

12. The control method of claim 10, wherein
the step of generating the driving route traffic information comprises s generating the driving route information by combining first road link information contained in the first traffic information with second road link information contained in the second traffic information.

13. The control method of claim 10, wherein
the step of storing the information comprises storing the second traffic information according to a priority.

14. The control method of claim 10, wherein
the step of selecting the first adjacent vehicle comprises re-selecting the first adjacent vehicle from the first adjacent vehicles, based on a distance between the vehicle and the first adjacent vehicles, when the first adjacent vehicle out of the first range.

15. The control method of claim 10, wherein the step of storing the information comprises storing speed information of the vehicle for a predetermined period of time, when an adjacent vehicle is not present in the first range.

16. The control method of claim 10, wherein
the step of selecting the first adjacent vehicle comprises generating the second traffic information when an adjacent vehicle is not present in the second range.

17. The control method of claim 10, wherein
the step of collecting the information comprises performing communication with the first adjacent vehicles for a predetermined period of time.

18. The control method of claim 10, wherein
the step of generating the driving route traffic information comprises determining an arrival time to a destination, based on the generated driving route traffic information.

* * * * *